June 16, 1931.  F. W. GAY  1,809,895

PROTECTIVE SYSTEM FOR TRANSFORMERS

Filed Oct. 8, 1928   2 Sheets-Sheet 1

INVENTOR.
FRAZER W. GAY
BY
ATTORNEY

June 16, 1931. F. W. GAY 1,809,895
PROTECTIVE SYSTEM FOR TRANSFORMERS
Filed Oct. 8, 1928 2 Sheets-Sheet 2

INVENTOR.
FRAZER W. GAY
BY
ATTORNEY

Patented June 16, 1931

1,809,895

UNITED STATES PATENT OFFICE

FRAZER W. GAY, OF NEWARK, NEW JERSEY

PROTECTIVE SYSTEM FOR TRANSFORMERS

Application filed October 8, 1928. Serial No. 311,112.

This invention relates, generally, to means for protecting electrical machinery from abnormally high voltage surges such as those produced by lightning; and the invention has reference, more particularly, to a novel protective system for preventing injury to, or the discontinued operation of, transformers subject to such voltage surges.

Heretofore, the breakdown of transformer insulation as the result of lightning striking the transmission line near the transformer, has been considered as an act of God. However, the rapid advance in the electrical art is speedily removing such breakdowns from the field covered by acts of God and it is now becoming standard practice to require transformers to be designed so as to withstand lightning surges. This result is now being accomplished by using relatively poor insulation on the transmission lines and their equipment near transformers and a relatively much higher standard of insulation is employed in the construction of the transformer. The transmission line will therefore break down and largely dissipate such a charge before it reaches a transformer. The transformer, therefore, need only be insulated to withstand surges of such low value as cannot break down the line insulation.

Lightning or other surges of steep wave front cause an unequal distribution of the electrical stress both between layers and between turns of any single layer of a transformer winding. This unequal distribution of electrical stress necessitates the use of a greatly increased amount of insulation between layers and turns.

This invention has for an object to protect transformers from injury as the result of lightning and other surges by providing for the distribution of the electrical stress among the various layers of transformer windings in a substantially uniform manner. This distribution is accomplished by shunting each layer or pair of layers in the transformer by a condenser having a capacity that is relatively very great with respect to the capacity of the layer or pair of layers so shunted, both with respect to each other and also with respect to ground. Preferably a time delay is also introduced in the building up of the voltage across each pair of layers in order to allow the voltage to be distributed among the various turns of the layers. This time delay may be produced by a choke coil shunted by a resistance and also a resistance is placed in series with each individual transformer condenser. When a surge is impressed upon the transformer and its associated protective system, the surge voltage is distributed between the choke resistance and transformer resistances substantially in proportion to their values and between the various layers substantially in proportion to the resistances in series with their respective condensers. The plurality of resistances act as a potentiometer to distribute the impressed voltage across the choke coil and the various layers as desired. The choke coil and its associated resistance serves to absorb a substantial part of the surge voltage until the balance of such surge voltage has been substantially uniformly distributed among the turns of each coil as well as among the various coils.

In the preferable form of the invention, the resistances and condensers are not directly tapped to the transformer windings but are coupled to the same.

Other objects of this invention, not at this time more particularly enumerated, will be clearly understood from the following detailed description of the same.

The invention is clearly illustrated in the accompanying drawings, in which:—

Similar characters of reference are employed in all of the hereinabove described views to indicate corresponding parts.

Figure 1:
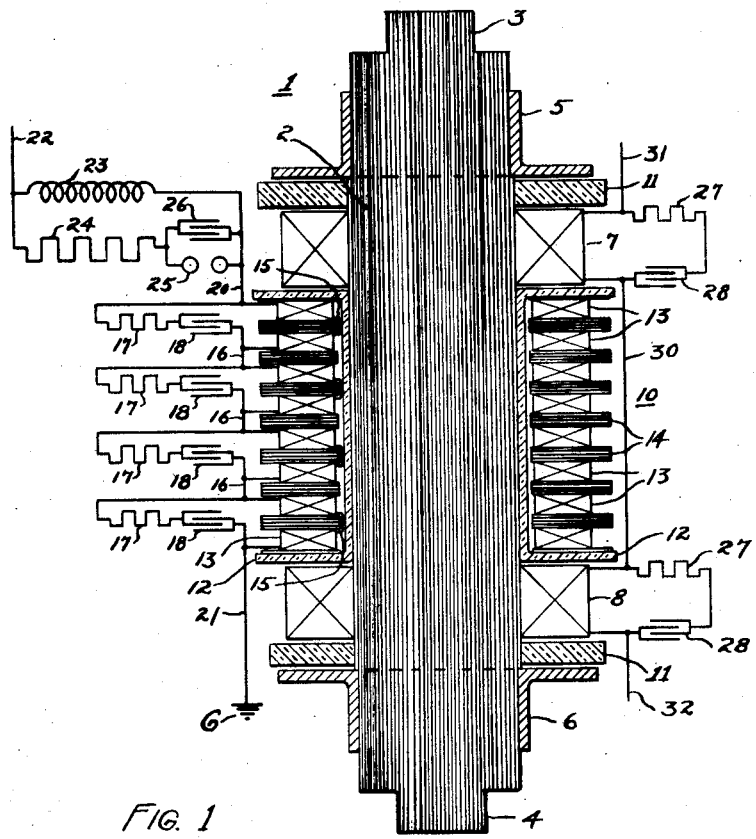
Figure 1 is a schematic sectional view of a shell type transformer provided with a simple form of the novel protective system of this invention.

Referring now to Fig. 1 of the drawings, the reference character 1 indicates a shell type power transformer having a core leg 2 and yokes 3 and 4. The transformer windings surround the core leg 2 and comprise the low tension coils 7 and 8 between which the high tension coil stack 10 is positioned. These coils or windings are retained in desired position with respect to the core leg 2 as by clamp angles 5 and 6 secured to the yokes 3 and 4. Insulating blocks 11 are positioned between the clamp angles 5 and 6 and the low tension coils 7 and 8. The high tension coil stack 10 is insulated from the low tension coils and the core leg 2 by built up insulation 12. This high tension coil stack 10 consists of a series of coils 13 which are insulated from each other by a plurality of insulating washers 14. The coils 13 are illustrated as back wound in pairs, the two coils comprising each pair being connected together at their inside by the leads 15. Each pair of coils so wound is connected on the outside to the next succeeding pair of coils by conductors 16.

According to the principles of this invention, each pair of coils is connected in parallel with a circuit comprising a resistance 17 and a condenser 18. The upper and lower end coils of the coil stack 10 are connected to terminal leads 20 and 21 respectively. Terminal lead 20 is connected to a high tension transmission line 22 through a reactor 23 shunted by a series circuit comprising a resistance 24 in series with a spark gap 25. A condenser 26 may be substituted for the spark gap 25 or this condenser may be used in parallel with the spark gap 25 as illustrated in Fig. 1. Any other suitable valve, such as a lightning arrester may be used in place of the spark gap 25 and condenser 26.

The low tension coils 7 and 8 are also illustrated as being connected in parallel with circuits comprising a resistance 27 and a condenser 28. These coils are interconnected by leads 30 and are connected in their external circuit by terminal leads 31 and 32.

The parallel circuits comprising the resistances 17 and condensers 18 are designed so as to offer a very high impedance to the passage of current having the normal operating frequency and voltage of the transformer 1, but are adapted to pass surges such as those produced by lightning which have a steep wave front. Reactor 23 on the other hand is adapted to pass the normal current of the transformer 1 with little impedance but is adapted to severely limit the flow of surge current to the high tension coil stack 10. This novel arrangement of protective system permits the normal and unimpaired operation of the transformer 1, the high tension current passing through coils 13, conductors 16, terminal lead 20 and reactor 23 to the high tension transmission line 22.

In the event that a surge, such as a lightning surge, comes in on the high tension line 22, it is held up several micro-seconds by the action of the reactor or choke coil 23. However, a substantial current almost instantly passes through the non-inductive resistance 24, the spark gap 25 and condenser 26, thereby bypassing reactor 23. This current passes through lead 20 and resistances 17 and condensers 18 to lead 21 and thence to the ground G. This current in its passage gradually charges the condensers 18. Condensers 18 and resistances 24 and 17 are so proportioned that for the first few micro-seconds the voltage as it builds up across the coil stack, is distributed substantially uniformly across successive pairs of coils. The voltage distribution among the several coils of the coil stack is not exactly proportional to the magnitude of the successive resistances 17 by reason of the fact that there is a gradual diminution of charging current flowing in successively lower resistances 17 in the coil stack owing to leakage currents flowing to ground as a result of winding to ground capacities inherent in the transformer. The distribution of voltage may be made practically uniform by varying the values of successive resistances 17 to compensate for this leakage current.

The desirability of instantly building up voltage across each pair of coils may best be explained by describing what happens when an ordinary power transformer receives a current surge and is not equipped with the protective system of this invention. In such case, a high voltage is thrown upon the transformer winding and if this high voltage is also accompanied by a large amount of stored energy near the transformer it will be found that a relatively great current flows to the end turns of the transformer winding for an exceedingly short period of time. This current acts to charge the end turns of the winding to a very high voltage since the rate of building up of current in the end turns of the transformer winding is not sufficient to drain off this electric charge of current impressed and the voltage consequently builds up across the end turns of the winding to a very high value. If the surge is very severe, the piled up voltage may cause a disruptive current to discharge through the insulating oil of the transformer between end layers or even through the solid insulation of the end turns. This generally results in a short circuit and the destruction of the transformer.

The impedance of a transformer winding is very great and when a lightning surge is impressed on the winding, even with full voltage across the end layers the current will build up in the end turns only at the rate of a few amperes per micro-second which is not sufficient to start any considerable flux change in the transformer core. Several micro-seconds are likely to pass before sufficient current has started to flow in a requisite number of turns to produce a desired rate of change in flux in the core and a consequent substantial counter-electromotive force developed in each turn. In other words, when voltage is impressed upon a transformer, the resulting flow of current is opposed at the start by the self induction of the windings which opposes the passage of the magnetizing current. The self induction voltage is concentrated on the end turns by reason of the fact that all the turns and layers are short circuited on themselves by reason of the capacity inherent in the transformer. It is necessary either for a considerable current to build up through the end layers and thereby charge the remaining layers, or it is necessary for the flux on the transformer core to induce voltage in the mid-turns and charge their capacities, both between turns, layers and all parts of the transformer and ground.

In general, the end turns of the windings of transformers as heretofore built may be considered for the period of the first micro-second after a current surge as primaries which accept full voltage and whose initial current is both magnetizing current for the entire transformer and primary current to supply capacity current induced in the mid-turns by any magnetic flux that may start in the core. Thus, during the first micro-second the mid-turns may be considered as a short circuited secondary. Between any turns or layers of the winding there is distributed capacity which exists between such turns and layers themselves and between such turns and layers and ground. It will be evident to one skilled in the art that voltage cannot be built up in such turns and layers without a corresponding charging current flowing in said turns and layers. If such voltage were built up at an infinite rate the current flowing would become infinite. This charging current will act to oppose the magnetic forces acting to establish the same. In other words such charging currents flowing in the mid-turns of the transformer will cause such turns to act as the secondary of a transformer to absorb energy which the end turns will endeavor to supply to the same inductively through the core. It will also be noted that any other windings that the transformer may have, will also possess distributed capacities which will act in effect as short circuits of such windings during the first micro-second and prevent the building up of flux. It is apparent that if one end of the winding is grounded, a still greater concentration of voltage will occur at the ungrounded end. Such concentration of voltage is not only present for the first micro-second but may last for many micro-seconds before all capacities inherent in the transformer have been initially charged and the magnetizing current attained a normal value and is uniformly distributed.

It will be apparent from the above that to protect the transformer from disruptive charges it is necessary upon the occurrence of a surge, to distribute the voltage during the first few micro-seconds thereafter throughout the winding and without relying upon magnetic induction in the core. This is accomplished in the instant invention by shunting the end turns with resistances 17 and condensers 18. The resistances in series between the transmission line 22 and the ground G are of such value that they will pass a large percentage of the entire required charging current in the first micro-second. When surge voltage is thrown on the transformer a heavy current will flow through resistance 24, condenser 26 and spark-gap 25 and will proceed to charge the top coil 13. As this coil rises in potential, the current passing through the first of the resistances 17 will increase and flowing through the associated uncharged condenser 18 will proceed to charge the second and third coils 13 reading down from the top of the winding 10. As these coils become charged and rise in potential, current flow in the next succeeding resistance 17 and condenser 18 will increase thereby charging the fourth and fifth coils 13 and so on till all of the coils 13 have been charged. At the end of the first micro-second there will be an appreciable current flowing in the bottom resistance 17 even though the current flowing through the turns of the top and remaining coils is exceedingly small.

Each of the circuits comprising the resistance 27 and the condenser 28 that are in parallel with the low tension coils 7 and 8 act in a manner similar to that described above to protect the low tension coils from possible injury resulting from surges in the low tension circuit 31, 32.

Figure 2:
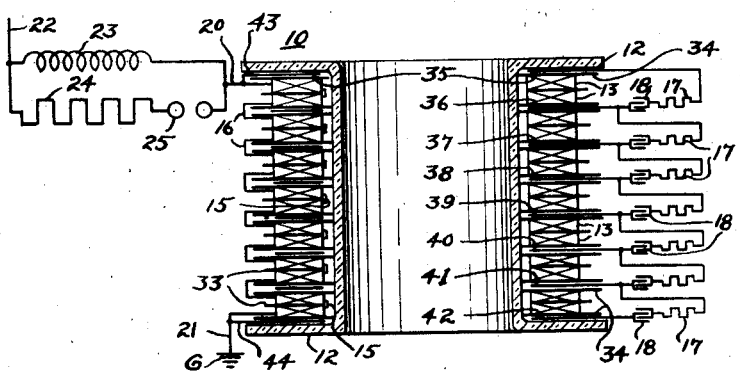
Figure 2 is a schematic sectional view illustrating the high tension coil of a transformer provided with a modified form of the protective system of this invention.
Figure 3:
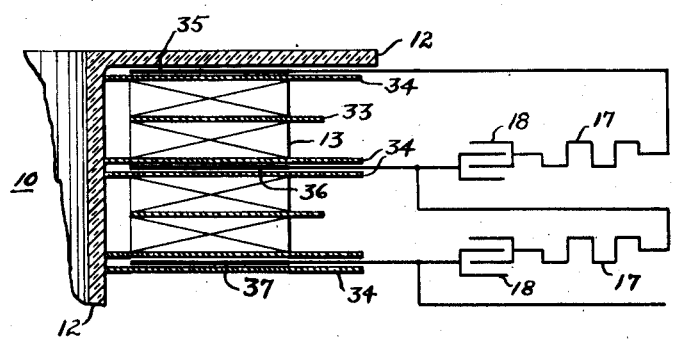
Fig. 3 is an enlarged fragmentary view of a portion of the structure of Fig. 2.

In Figs. 2 and 3, a modified form of the invention is illustrated in which the series of parallel circuits comprising each a resistance 17 and condenser 18 are connected to a plurality of annular metal plates or washers sandwiched between and insulated from adjacent pairs of coils 13. In these figures, parts corresponding to similar parts of Fig. 1 have the same reference characters. Also only the high tension coil stack 10 and its connections are shown, the remainder of the transformer structure being omitted. Insulating washers 34 are interposed between the top and bottom coils 13 of the coil stack 10 and the built up insulation 12. Pairs of such insulating washers 34 are also positioned between successive pairs of coils 13. Insulating washers 33 are positioned between the coils of each pair of coils 13. A plurality of annular metallic plates or washers 35 to 42 are positioned adjacent the ends of the successive pairs of coils 13 but are insulated from these coils by the washers 34. The top annular plate 35 is connected to terminal conductor 20 by a lead or jumper 43. Also the bottom annular plate 42 is connected by a lead 44 to the terminal conductor 21. The uppermost parallel circuit comprising a resistance 17 and condenser 18 is connected across the annular plates 35 and 36. The second such circuit is connected across annular plates 36 and 37. Successive parallel circuits are connected across successive annular plates.

The parallel circuits comprising the resistance 17 and condenser 18 offer a very high impedance to the normal operating current of the transformer, but are adapted to pass abnormal surges in the same manner that such surges were passed in the form of the invention illustrated in Fig. 1. When such a surge is impressed upon the system of Figs. 2 and 3 the annular plates 35 will be charged by current passing through resistance 24, spark gap 25, terminal lead 20, and jumper 43. Successive plates 36 to 42 will be progressively charged. The coils 13 lying between these plates will also be charged. Any pair of coils 13 will be charged to a potential that is midway between that of its adjacent annular metallic plates.

Figure 4:
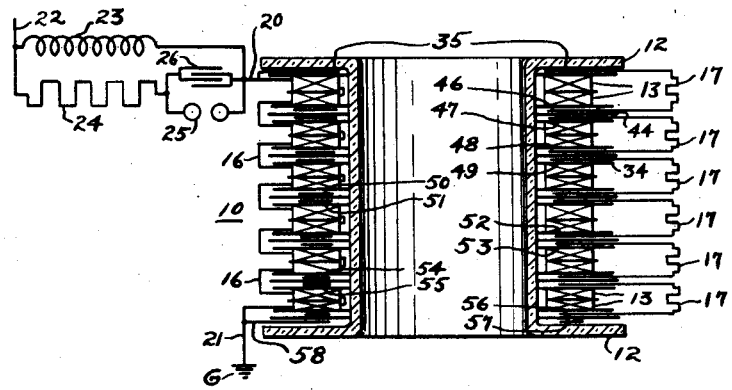
Fig. 4 is a view similar to Fig. 2 and illustrates the preferred form of the invention.
Figure 5:
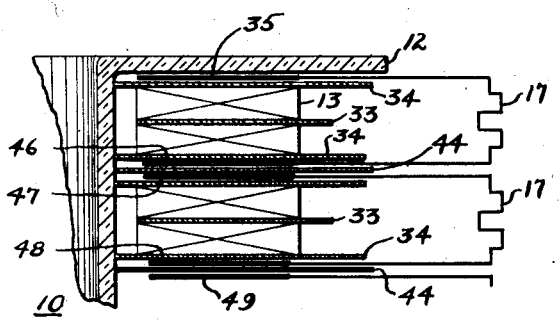
Fig. 5 is an enlarged fragmentary view of a portion of the structure of Fig. 4.
Figure 6:
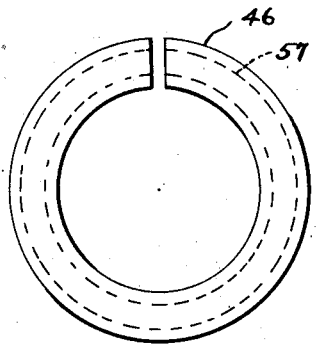
Fig. 6 is a plan view of condenser plates employed in the novel protective system illustrated in Fig. 4.

Figs. 4 to 6 illustrate the preferred form of the invention. According to the arrangement illustrated in these figures, the condensers of the parallel circuits are sandwiched between successive pairs of coils 13. The plates of these condensers are similar in form to the plates 35 to 42 of Fig. 2 and are spaced by insulating washers 44 that are inserted between insulating washers 34. The plates of these condensers are designated by the reference numerals 46 to 57. Plates 46 and 47 are separated by a washer 44 and comprise a condenser that takes the place of one of the condensers 18 of the preceding figures. Similarly plates 48 and 49 form another such condenser and so on for the entire height of the coil stack 10. The resistances 17 are successively connected in series with the consecutive condensers 46—47, 48—49, 50—51, etc. Plate 57 of the lowest condenser is connected by jumper or lead 58 to the terminal lead 21 connected to ground.

In the event that a surge such as that produced by lightning is impressed on the transmission line 22 near the transformer 1, such surge will pass through resistance 24, condenser 26 and spark gap 25 to plate 35 charging this plate. From the plate 35 this charging current will pass to the successive condensers 46—47 to 56—57 charging such condensers and the coils 13 between such condensers in succession. Each pair of coils 13 will assume a potential that is midway between the potentials of the condenser plates adjacent the ends of such pair of coils. Since the bottom coil 13 is grounded by the terminal lead 21, the top coil will absorb the greatest electrostatic charge of any of the coils. The charging current flowing to any one of the successive coils will decrease in magnitude in accordance with the spacing of such coil from the top coil 13. Consequently the top resistance 17 should be of relatively low magnitude as compared with the remaining resistance. Each such resistance should increase in magnitude in accordance with its spacing from the top resistance 17. Also the top condenser 46—47 should be of relatively great capacity while succeeding condensers should be of correspondingly lesser capacity. This result is accomplished by making the top condenser plates 46—47 of large area while succeedingly lower condenser plates are of lesser area. This is especially illustrated in Fig. 6 wherein the relative widths of condenser plates 46 and 57 are shown, plate 57 being of considerably less area than plate 47.

It is to be understood that electric valves such as lightning arresters may be substituted for the condensers 18 in the modifications of the invention illustrated in Figs. 1 to 3. In such event the parallel circuits comprising the electric valves 18 and resistances 17 would offer an unlimited impedance to the flow of normal transformer currents, thereby preventing energy loss in the transformer.

It will be apparent that condensers 18 and 46—47 to 56—57 may be shunted across each and every coil 13 or layer or even every turn if desired.

While one terminal of the transformer 1 is shown grounded in the drawings as is standard practice in a three phase star connected transformer bank, it will be apparent that the transformer may be operated ungrounded and have its terminals connected line to line in which event the protective system of this invention would function as before.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination with a transformer, a protective system therefor, said protective system comprising, a plurality of consecutive sets of resistances and condensers connected in series, the condensers of said consecutive sets being electrostatically coupled to successive coils of a winding of said transformer.

2. In combination with a transformer, a protective system therefor, said protective system comprising, a plurality of interconnected circuits shunting a winding of said transformer, said circuits having resistances and condensers in series and being electrostatically coupled to said transformer winding at a multiplicity of points.

3. In combination with a transformer, a protective system therefor, said protective system comprising a choke coil in series relation with a winding of said transformer, a parallel circuit extending around said choke coil, said parallel circuit comprising a resistance and an electric valve and being adapted to pass surge currents past said choke coil, interconnected circuits shunted across said transformer winding, said interconnected circuits comprising resistances and condensers in series relation and being electrostatically coupled to said transformer winding at a plurality of points.

4. In combination with a transformer having a high voltage winding, of a protective system therefor comprising, a plurality of consecutive impedances arranged across said winding and consecutive electrostatic couplings interposed between consecutive impedances and portions of said winding, said protective system offering essentially a resistance reaction to the passage of surge currents and essentially a capacity reactance to the passage of low frequency currents.

5. In combination with a transformer having a high voltage winding consisting of a plurality of groups of coils, a plurality of circuits, each of said circuits being electrostatically coupled across one of said groups of coils, each said circuit offering essentially a resistance reaction to the passage of surge currents and essentially a capacity reactance to the passage of low frequency currents.

In testimony, that I claim the invention set forth above I have hereunto set my hand this 5th day of October 1928.

FRAZER W. GAY.